US009703374B1

(12) United States Patent
Zhang

(10) Patent No.: US 9,703,374 B1
(45) Date of Patent: Jul. 11, 2017

(54) IN-CELL GAZE TRACKING FOR NEAR-EYE DISPLAY

(71) Applicant: Google Inc., Mountain View, CA (US)

(72) Inventor: Zhibin Zhang, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 11 days.

(21) Appl. No.: 14/971,477

(22) Filed: Dec. 16, 2015

(51) Int. Cl.
G09G 5/00 (2006.01)
G06F 3/01 (2006.01)
G06K 9/00 (2006.01)
G06T 7/00 (2017.01)
G02B 27/01 (2006.01)

(52) U.S. Cl.
CPC ......... G06F 3/013 (2013.01); G02B 27/0172 (2013.01); G06K 9/00604 (2013.01); G06T 7/0042 (2013.01); G02B 2027/014 (2013.01); G02B 2027/0138 (2013.01); G06T 2207/10028 (2013.01)

(58) Field of Classification Search
CPC .................. G02B 27/01; G02B 27/017; G02B 2027/0118; G02B 2027/0187; G06F 3/011; G06F 3/013; H04N 7/144; H04N 13/0484
See application file for complete search history.

(56) References Cited

U.S. PATENT DOCUMENTS 5,340,978 A 8/1994 Rostoker et al.
6,050,717 A * 4/2000 Kosugi ................ G05B 19/409
345/214
6,483,484 B1 * 11/2002 Yamazaki ................ A61B 5/16
345/8
7,042,486 B2 5/2006 Manico et al.
7,535,468 B2 5/2009 Uy
7,830,461 B2 11/2010 Abileah et al.
8,212,859 B2 * 7/2012 Tang .................. G02B 27/0172
345/8
8,235,529 B1 * 8/2012 Raffle .................... A61B 3/113
351/209
8,253,662 B2 * 8/2012 Yamazaki ................ G09G 3/30
315/169.3
8,441,422 B2 5/2013 Abileah et al.
9,158,113 B2 10/2015 Amirparviz et al.
(Continued)

OTHER PUBLICATIONS

Guo-Zhen Wang, et al., "Bare Finger 3D Air-Touch System Using an Embedded Optical Sensor Array for Mobile Displays", Journal of Display Technology, vol. 10, No. 1, Jan. 2014, pp. 13-18.
(Continued)

Primary Examiner — Joe H Cheng

(57) ABSTRACT

A near-eye display device includes a display panel with an array of photon-emitting cells interspersed with photon-detecting cells and a display controller coupled to the display panel, the display controller to control the display panel to display imagery using the array of photon-emitting cells. The device further includes a camera controller coupled to the display panel, the camera controller to control the display panel to capture imagery of an eye of a user using the photon-detecting cells. The device also includes an eye-tracking module coupled to the camera controller, the eye-tracking module to construct a three-dimensional representation of the eye based on the captured imagery.

23 Claims, 6 Drawing Sheets

(56) References Cited

U.S. PATENT DOCUMENTS

| | | | | |
|---|---|---|---|---|
| 2001/0020922 A1* | 9/2001 | Yamazaki | ............... | G09G 3/30 345/45 |
| 2005/0195277 A1* | 9/2005 | Yamasaki | ............ | G02B 27/017 348/61 |
| 2009/0271732 A1* | 10/2009 | Kondo | ............... | G02B 27/0093 715/781 |
| 2010/0012817 A1 | 1/2010 | Vogel et al. | | |
| 2010/0097580 A1* | 4/2010 | Yamamoto | ........... | G02B 26/101 353/69 |
| 2011/0181587 A1 | 7/2011 | Nakamura et al. | | |
| 2012/0300978 A1* | 11/2012 | Eberl | ..................... | A61B 3/113 382/103 |
| 2013/0114043 A1* | 5/2013 | Balan | ................. | H04N 13/044 351/210 |
| 2013/0257709 A1* | 10/2013 | Raffle | ..................... | G06F 3/013 345/156 |
| 2014/0145939 A1 | 5/2014 | Herold et al. | | |
| 2014/0313308 A1 | 10/2014 | Wang et al. | | |
| 2015/0326570 A1* | 11/2015 | Publicover | ........ | H04N 5/23229 726/4 |
| 2016/0026253 A1* | 1/2016 | Bradski | ............... | G02B 27/225 345/8 |
| 2016/0116741 A1* | 4/2016 | Sato | ..................... | G02B 27/017 345/8 |
| 2016/0187662 A1* | 6/2016 | Sato | ..................... | G02B 27/017 345/8 |
| 2016/0378180 A1* | 12/2016 | Theytaz | .................. | G06F 3/013 345/8 |

OTHER PUBLICATIONS

Microsoft, "The Power of PixelSense," Nov. 13, 2015, http://www.microsoft.com/en-us/pixelsense/pixelsense.aspx.com, pp. 1-2.

"OpenCV: Depth from Stereo Images," Dec. 14, 2015, http://docs.opencv.org/master/dd/d53/tutorial_py_depthmap.html#gsc.tab=0, pp. 1-2.

Hodges, Steve, et al., "ThinSight: Versatile Multi-touch Sensing for Thin Form-Factor Displays," Microsoft Research Cambridge, UIST '07, Oct. 7-10, 2007, pp. 259-268.

Invitation to Pay Additional Fees and, Where Applicable, Protest Fee and Partial Search Report correlating to PCT/US2016/055537 dated Feb. 6, 2017, 8 pages.

Apter, B. and Thirer, N., "Design of integrated eye tracker-display device for head mounted systems", Proceedings of SPIE, The International Society for Optical Engineering, Aug. 2009, 14 pages.

International Search Report and Written Opinion correlating to PCT/US2016/055537 dated Mar. 30, 2017, 25 pages.

* cited by examiner

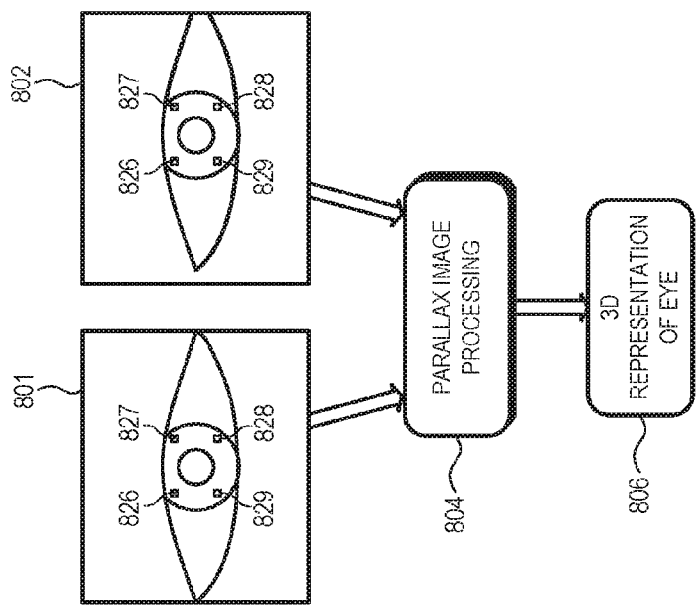
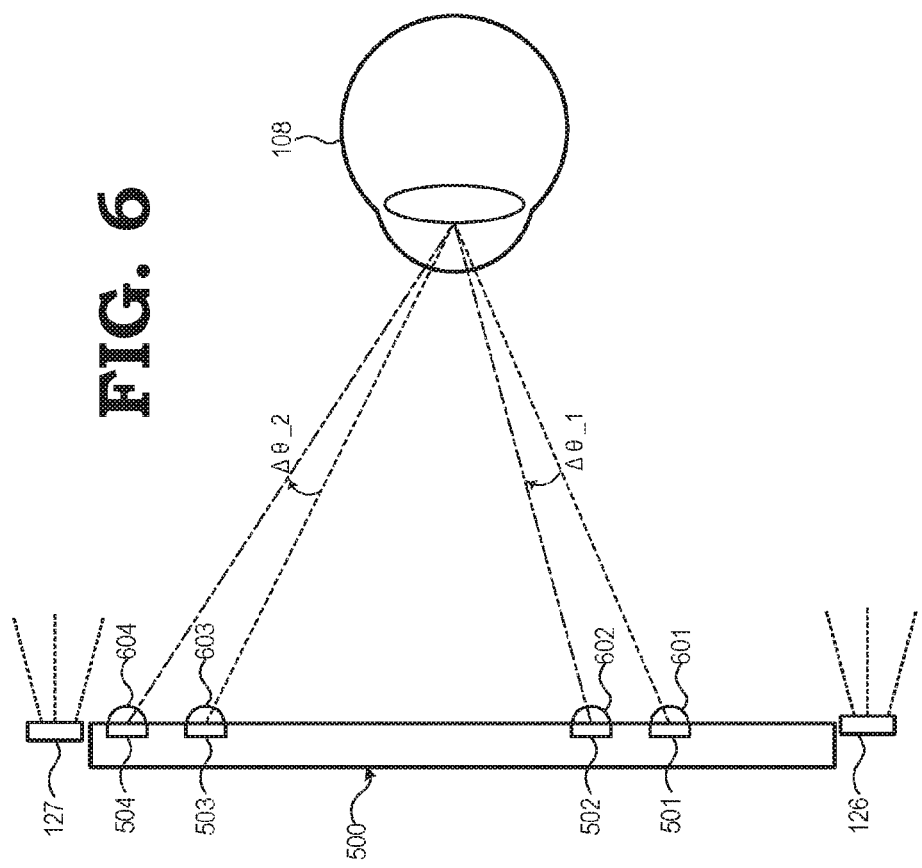

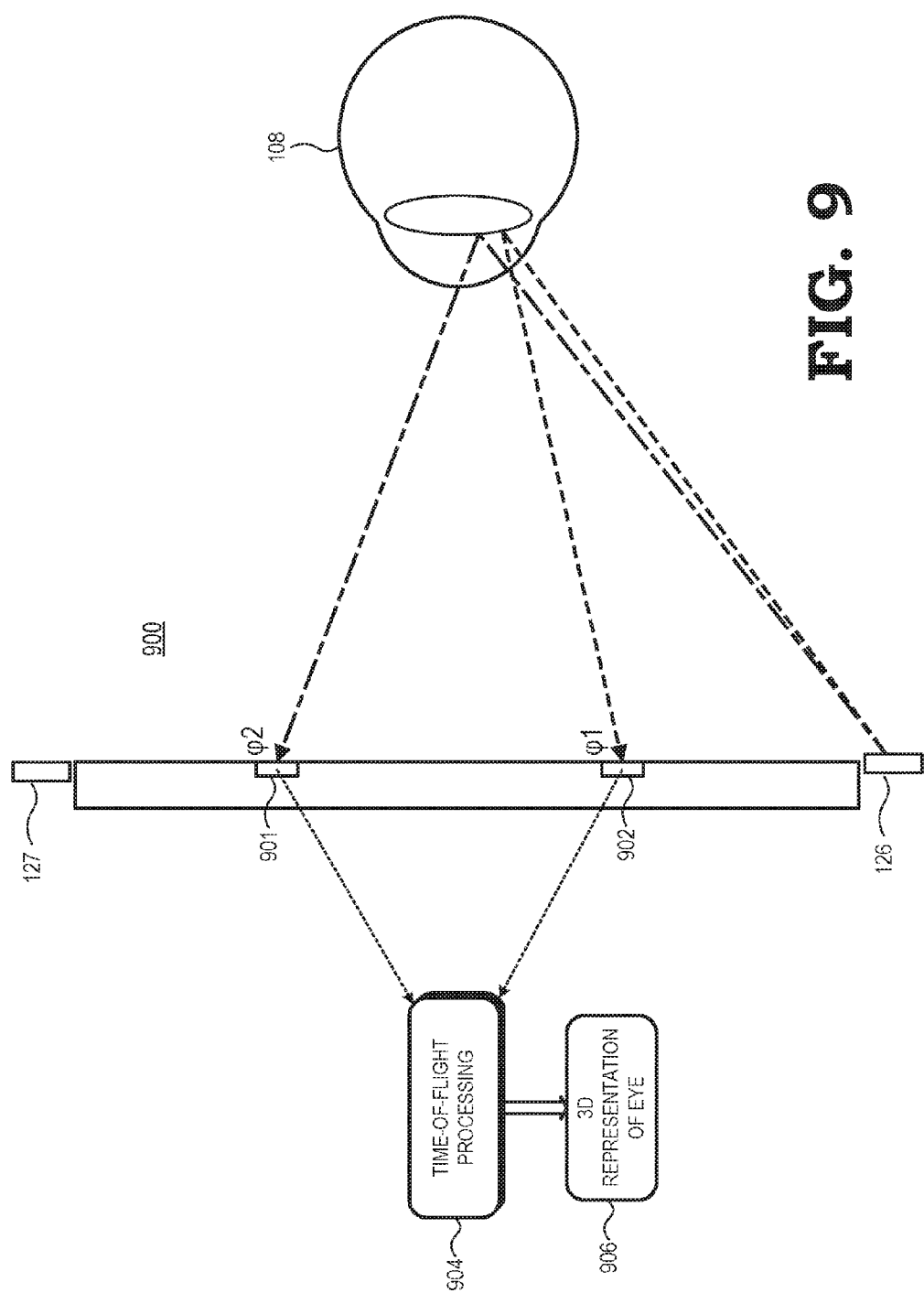

IN-CELL GAZE TRACKING FOR NEAR-EYE DISPLAY

FIELD OF THE DISCLOSURE

The present disclosure relates generally to near-eye display systems and more particularly to eye tracking in near-eye display systems.

BACKGROUND

Head mounted display (HMD) devices and other near-eye display systems utilize a display panel mounted in front of a user's eyes to display various types of content, including virtual reality (VR) content, augmented reality (AR) content, and the like. Eye tracking often is implemented in such near-eye display systems to facilitate various functionalities, such as foveated imaging (also known as gaze-contingent imaging), eye-movement based user input or interaction, and the like. Conventional eye tracking mechanisms typically employ a complex arrangement of lenses and mirrors to capture an image of the eye, and from this image estimate a gaze direction of the eye. However, the complex optical mechanism required in conventional systems to provide this eye tracking function without occluding the display panel often inhibits implementation of a small form factor for the HMD device.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 6 is a diagram illustrating a cross-section view of a portion of the display panel of FIG. 5 and a user's eye for concurrent capture of a stereo pair of images of the user's eye in accordance with at least one embodiment of the present disclosure.

FIG. 8 is a diagram illustrating a parallax-based processing of the stereo pair of images of FIG. 6 for generation of a three-dimensional representation of the user's eye in accordance with at least on embodiment of the present disclosure.

FIG. 9 is a diagram illustrating a cross-section view of the display panel of FIG. 2 and a user's eye and a corresponding method of construction of a three-dimensional representation of the user's eye based on a time-of-flight analysis in accordance with at least one embodiment of the present disclosure.

DETAILED DESCRIPTION

The following description is intended to convey a thorough understanding of the present disclosure by providing a number of specific embodiments and details involving eye-tracking systems for head-mounted display (HMD) devices and other near-eye display systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-9 illustrate example devices and techniques for eye tracking in near-eye display devices. In at least one embodiment, one or more display panels implemented by a near-eye display device each implements an array of photon-emitting cells, and additionally implements a plurality of photon-detecting cells interspersed among the array of photon-emitting cells. For display purposes, the near-eye display device operates the array of photon-emitting cells to display imagery for viewing by a user. For eye tracking purposes, a camera controller operates the photon-detecting cells to capture imagery of an eye of the user, and from this captured imagery constructs a three-dimensional (3D) representation of the eye. The near-eye display device then may track the gaze of the user from this 3D representation of the eye, and control one or more operations of the near-eye display device accordingly. As the display panel serves to both display imagery to the user and capture imagery of the user's eye for eye tracking purposes, complex optical assemblies typically used for eye tracking may be avoided.

In some embodiments, the camera controller operates as a time-of-flight (ToF) camera and thus determines the 3D representation of the eye based on a ToF analysis of the input from the photon-detecting cells of the one or more display panels. In other embodiments, the photon-detecting cells are organized as two subsets, with each photon-detecting cell in one subset being paired with a corresponding photon-detecting cell in the other subset. In this implementation, the camera controller uses one subset of photon-detecting cells to capture one image of the eye while concurrently capturing another image of the eye using the other subset of photon-detecting cells. The resulting two images constitute a stereo pair of images of the user's eye, and thus may be processed using the principle of parallax to construct the 3D representation of the user's eye.

Figure 1:
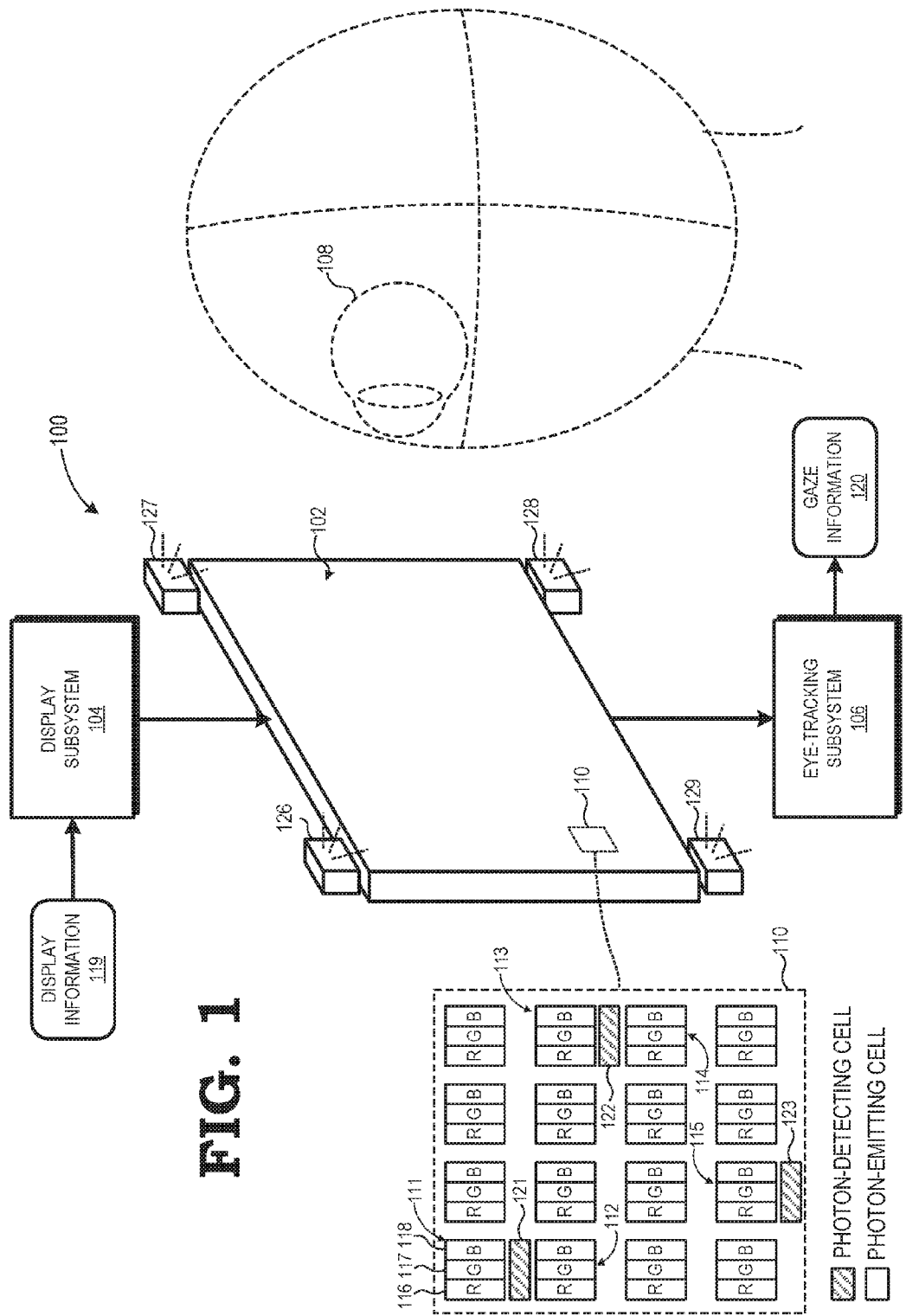
FIG. 1 is a diagram illustrating an arrangement of components of an eye-tracking system for a near-eye display device implementing a display panel used for both display of imagery and capture of eye imagery in accordance with at least one embodiment of the present disclosure.

FIG. 1 illustrates an eye-tracking system 100 for implementation in an HMD device, a heads-up display device, or similar display system in accordance with at least one embodiment. As depicted, the eye-tracking system 100 includes one or more display panels 102, a display subsystem 104, and an eye-tracking subsystem 106. In some embodiments, a single display panel 102 is used to jointly display separate side-by-side images, one for each eye 108 of the user. In other embodiments, a separate display panel 102 is used for each eye 108. In still other embodiments, an array of two or more display panels 102 may be implemented for each eye 108. Further, although omitted from FIG. 1 for ease of illustration, one or more optical lenses may be positioned along a view axis between the display panel 102 and the eye 108.

As illustrated by enlarged view 110, the display panel 102 comprises an array of photon-emitting cells that are controlled by a display controller of the display subsystem 104 to display imagery to the eye 108 of the user. The photon-emitting cells may be implemented using any of a variety of well-known photon-emitting circuits. For example, the photon-emitting cells may be implemented as light-emitting diodes (LEDs), organic LEDs (OLEDs), liquid crystal display (LCD) cells, and the like. To illustrate, in the example of FIG. 1, the display panel 102 implements a red-green-blue (RGB) pixel geometry as is often found in LED-based and OLED-based displays. In such implementations, the LED cells of the array are arranged as groups referred to as "picture elements" or "pixels", such as pixels 111, 112, 113, 114, 115 illustrated in enlarged view 110. Each pixel includes at least one LED cell for each base color, such as an LED cell 116 configured to emit red-colored light (R), an LED cell 117 configured to emit green-colored light (G), and an LED cell 118 configured to emit blue-colored light (B). In some pixel geometries, there may be more than one LED cell of a particular color, such as the RGGB pixel geometry that implements two LED cells configured to emit green-colored light in view of the emphasis on green light in human perception. The display subsystem 104 thus controls the intensity of light emitted by each LED cell of a given pixel so that the pixel emits a particular color that is a combination of the colors of light emitted by the LED cells of the pixel, and through this operation controls each pixel of the display panel 102 to display the array of pixels of a corresponding image. The display subsystem 104 thus controls the display panel 102 to display a sequence of images so as to present imagery to the user in the form of virtual reality (VR) content, augmented reality (AR) content, or a combination thereof, received by the display subsystem 104 as display information 119.

To track the gaze of the user, the eye-tracking subsystem 106 captures imagery of the eye 108, and from this captured eye imagery constructs a 3D representation of the eye 108. The 3D representation of the eye 108 then may be analyzed to determine various features of the eye 108 related to gaze (gaze information 120), such as the presence or absence of the eye 108 (that is, whether the user has mounted the display system or is otherwise looking at the display panel 102), whether the user's eyelid is open or closed, the position or orientation of the eye 108, and the like. To avoid occluding the display, a conventional system would implement a complex optical apparatus disposed between the display and the eye and including one or more mirrors, one or more lenses, and the like play.

In at least one embodiment, the eye-tracking system 100 reduces or eliminates the need for this complex optical apparatus by implementing an eye-tracking image sensor in the display panel 102 itself, that is "in-cell" with the display panel 102. To this end, the display panel 102 implements a plurality of photon-detecting cells that are interspersed among the array of photon-emitting cells in the active area or substrate of the display. These photon-detecting cells may be implemented as, for example, charge-coupled device (CCD) cells, complementary metal oxide (CMOS) cells, and the like. An example implementation of the photon-detecting cells is described in greater detail below with reference to FIG. 3.

In a typical implementation of an LED panel or OLED panel, the fill factor for photon-emitting cells typically is between 50-70%, leaving approximately 30-50% of the surface area of the active area of the substrate of the display panel 102 unoccupied by photon-emitting cells. Accordingly, in at least one embodiment, this otherwise unoccupied space is utilized for implementation of the photon-detecting cells. For example, as illustrated by the expanded view 110, the display panel 102 may implement photon-detecting cells in the areas between pixels, such as photon-detecting cell 121 implemented in the area of the substrate between pixel 111 and pixel 112, photon-detecting cell 122 implemented in the area of the substrate between pixel 113 and pixel 114, and photon-detecting cell 123 disposed in the area of the substrate between pixel 115 and an adjacent pixel (not shown). In other embodiments, the photon-detecting cells may be implemented by substituting a photon-detecting cell for a photon-emitting cell for each pixel of a selected subset of pixels of the display panel 102. To illustrate, as noted above the display panel 102 may implement an RGGB geometry whereby each pixel has two green-emitting cells, one red-emitting cell, and one blue-emitting cell. For a relatively small subset of these pixels, a photon-detecting cell may be implemented instead of one of the green-emitting cells for the pixel.

The photon-detecting cells together operate as an image sensor (or two image sensors in some embodiments), and thus the eye-tracking subsystem 106 includes a camera controller that controls the set of photon-detecting cells in a manner similar to the control of a conventional image sensor, such as by controlling the timing of the integration of the photon-detecting cells, the transfer of the collected charge to the corresponding circuitry of the photon-detecting cells for conversion to a digital value, the readout of these digital values, the clearing or resetting of the cells, and the like. To this end, the signaling paths to and from the photon-detecting cells may be implemented alongside the signaling paths of the photon-emitting cells, or the signaling paths may be implemented in separate areas of the substrate.

As a relatively small image resolution often is sufficient to provide effective gaze tracking analysis, the proportion of photon-detecting cells to display pixels of the display panel 102 may be relatively low. To illustrate, it has been found that an image of the eye with a resolution of only 400×400 pixels is often sufficient for most forms of gaze tracking. Accordingly, assuming the display panel 102 has a 1080p resolution, or 2,073,600 pixels total, the capture of a 400×400 image of the eye 108 would require only 160,000 photon-detecting cells, or approximately 7.7% of the number of display pixels in the display panel 102.

As the eye 108 is sensitive to visible light, in some embodiments light outside of the visible spectrum, such as infrared (IR) light (and more particularly, near infrared (NIR) light), is used to illuminate the eye 108 for purposes of eye tracking so as to avoid distracting the user. Moreover, the sources of this IR light may also serve as coordinate frame reference points for the eye tracking process. To illustrate, a set of one or more IR light sources, such as IR light sources 126, 127, 128, 129, may be implemented in a fixed positional relationship with the display panel 102 in a specified pattern. In some embodiments, the specific pattern of the set of IR light sources and their fixed relationship relative to the display panel 102 may serve as a coordinate frame reference. In some embodiments, this fixed positional relationship is obtained by affixing the IR light sources 126-129 in the display panel 102, such as at the four corners of the display panel 102 as depicted in FIG. 1, or along a border or "flex" of the display panel 102. In other embodiments, the IR light sources can be "virtually" embedded with relation to the display panel 102, such as by physically positioning the IR light sources near the camera space so that they are "virtually" positioned on the display panel 102 through one or more lenses. In either approach, because the IR light sources and the display panel 102 each are fixed, their relative position will not change and will therefore establish a fixed relative positional relationship between the IR light sources and the display panel 102. The IR light sources 126-129 each may comprise, for example, an IR-emitting vertical-cavity surface-emitting laser (VECSEL), an IR LED, and the like.

Any of a variety of techniques may be implemented by the eye-tracking system 100 to generate a 3D representation of the eye 108 based on imagery of the eye 108 captured by the eye-tracking subsystem 106 via the photon-detecting cells of the display panel 102. Two such example techniques include a parallax-based technique described below with reference to FIGS. 5-8, and a time-of-flight (ToF)-based technique described below with reference to FIG. 9.

Figure 2:
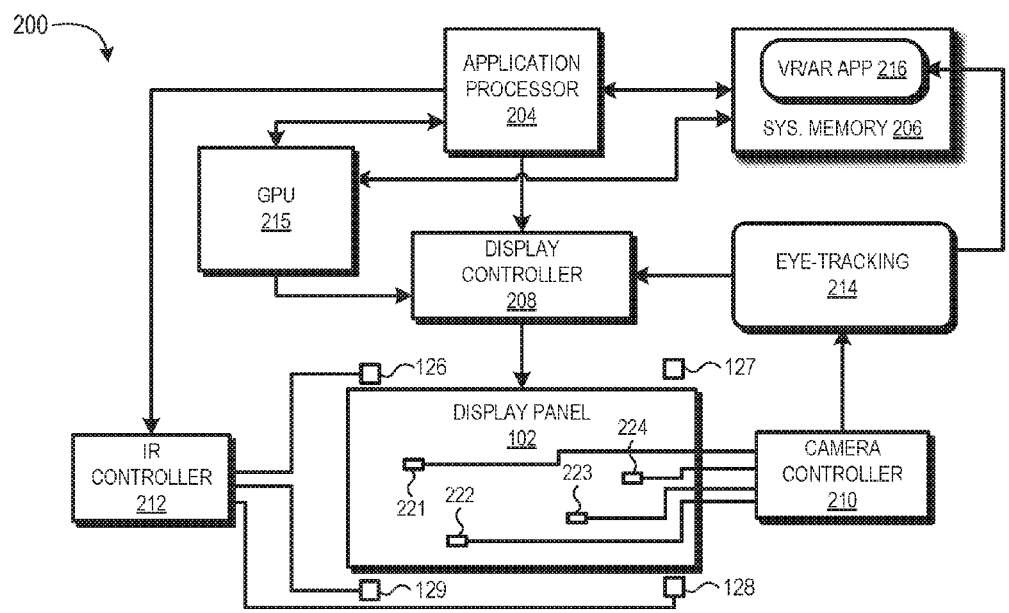
FIG. 2 is a block diagram illustrating an example hardware implementation of a near-eye display system in accordance with at least one embodiment of the present disclosure.

FIG. 2 illustrates an example hardware configuration 200 of a near-eye display system implementing the eye-tracking system 100 of FIG. 1 in accordance with some embodiments. The hardware configuration 200 includes an application processor 204, a system memory 206, a display controller 208, a camera controller 210, an IR controller 212, an eye-tracking module 214, and the display panel 102. The hardware configuration 200 further may include a graphics processing unit (GPU) 215. In one embodiment, the display subsystem 104 (FIG. 1) includes the application processor 204 and display controller 208, and the eye-tracking subsystem 106 includes the camera controller 210, the IR controller 212, and eye-tracking module 214. For ease of illustration, the hardware configuration 200 is illustrated in a configuration for tracking a single eye. However, for dual eye tracking implementations, the hardware configuration 200 would further include a second display controller 208, a second display panel 102, a second IR controller 212, and a second camera controller 210 for the second eye, which would operate in the same manner, with respect to the second eye, as that described below.

The eye-tracking module 214 may be implemented through software—that is, the application processor 204, the GPU 215, or combination thereof executing a set of executable instructions (that is, "software") stored in the system memory 206 or other storage location. Alternatively, the eye-tracking module 214 may be implemented as hard-coded logic, such as via an application specific integrated circuit (ASIC), programmable logic, and the like. Further, in some embodiments, the eye-tracking module 214 may be implemented through a combination of software and hard-coded logic. The application processor 204 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of at least some of the components of the hardware configuration 200. The display controller 208 may be implemented as, for example, an ASIC, programmable logic, as one or more GPUs executing software that manipulates the one or more GPUs to provide the described functionality, or a combination thereof.

In operation, one or both of the application processor 204 and the GPU 215 executes a VR/AR application 216 (stored in, for example, the system memory 206) to provide VR/AR functionality for a user. As part of this process, the VR/AR application 216 manipulates the application processor 204 or GPU 215 to render a sequence of images for display at the display panel 102, with the sequence of images representing a VR or AR scene. The display controller 208 operates to drive the display panel 102 to display the sequence of images, or a representation thereof, via the array of photon-emitting cells of the display panel 102. In parallel, the eye-tracking camera formed by the photon-detecting cells of the display panel 102 (e.g., photon-detecting cells 221, 222, 223, 224) and the camera controller 210 operate together with the IR controller 212 and the eye-tracking module 214 to track various gaze features of the eye 108 (FIG. 1) of the user based on a 3D representation of the eye 108 generated through imagery captured via photon-detecting cells.

Figure 3:
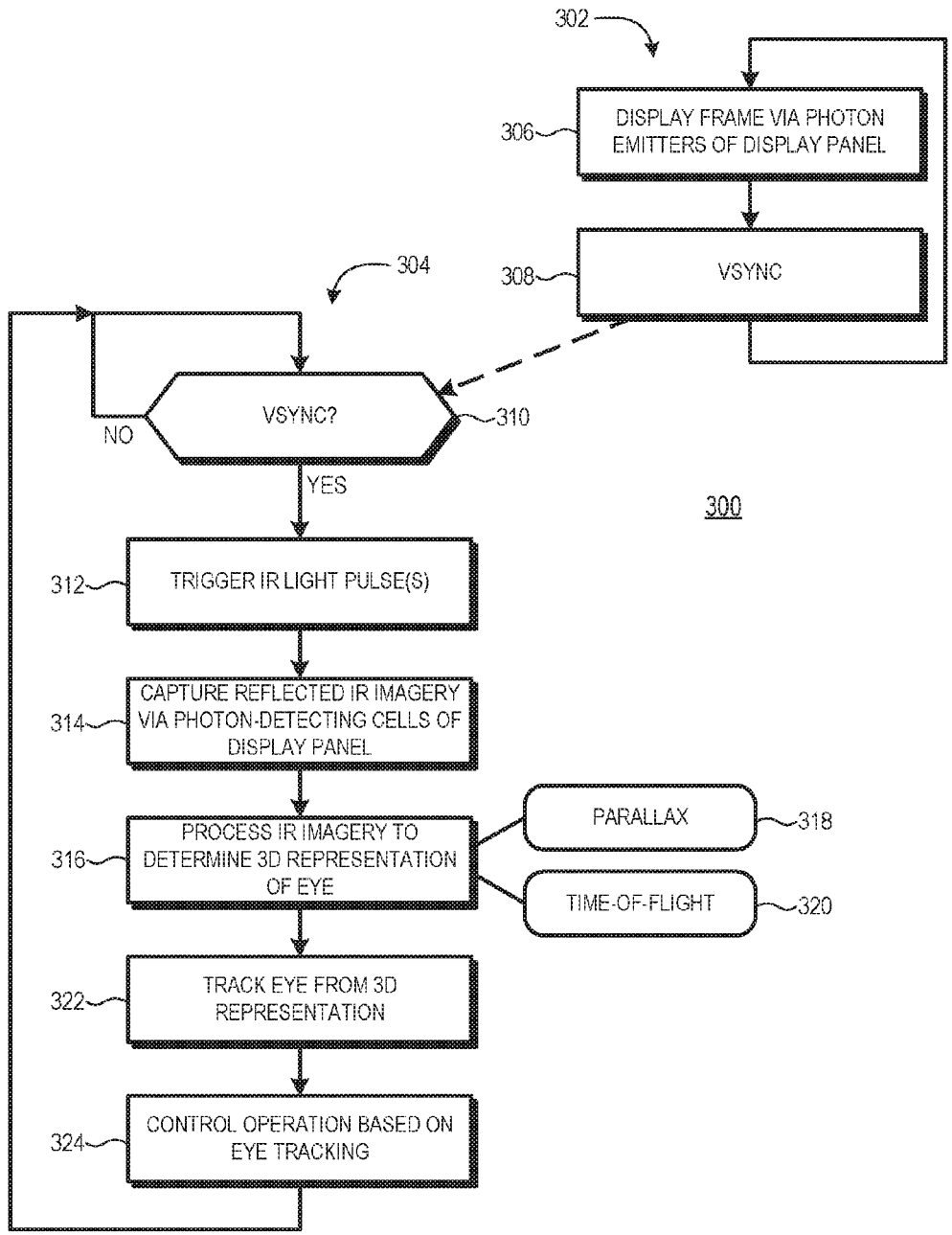
FIG. 3 is a flow diagram illustrating an example method for gaze tracking in a near-eye display system using a display panel having photon-detecting cells interspersed among an array of photon-emitting cells of the display panel in accordance with at least one embodiment of the present disclosure.

FIG. 3 illustrates an example method 300 of the parallel display/eye tracking operation via the display panel 102 in accordance with at least one embodiment of the present disclosure. As noted above, the display panel 102 has two concurrent, or parallel, operational modes: imagery display mode (represented by flow 302); and eye imagery capture mode (represented by flow 304). The imagery display mode includes, at block 306, the VR/AR application 216 executing to generate a display frame representing image content (e.g., VR or AR image content) and the display controller 208 operating to control the photon-emitting cells (not shown in FIG. 3) of the display panel 102 to emit corresponding light so as to display a representation of the display frame to the eye 108 of the user. In between successive display frames, the display controller 208 may provide, at block 308, a vertical synchronization (VSYNC) signal to signal the end of one display frame and the start of the next display frame. Typically, the VSYNC signal is provided during the vertical blanking interval (VBI) present between frames in many television standards, such as the Phase Alternating Line (PAL) and National Television Standards Committee (NTSC) standards.

As illustrated by block 310 of flow 304, in at least one embodiment the VSYNC signal is used to synchronize or coordinate the imagery display mode and the eye imagery capture mode so that the imagery capture of the eye 108 does not occur while a display frame is being actively displayed. Accordingly, in response to detecting at block 310 the VSYNC signal from the display controller 208, the application processor 204, display controller 208, or camera controller 210 directs the IR controller 212 to trigger one or more IR light flashes by the IR light sources 126-129 at block 312 so as to illuminate the eye with the IR light from the IR light flashes. Concurrently, at block 314, the camera controller 210 controls the display panel 102 so as to activate the photon-detecting cells of the display panel 102 in order to begin capture of an IR image (or pair of images) of the eye 108 by integrating the IR light reflected from the eye 108 and incident on the photon-detecting cells. After a sufficient integration period, the photon-detecting cells are deactivated and the integrated photon charge contained therein is converted to a corresponding intensity value, and the intensity values at the photon-detecting cells are read out of the display panel 102 into a frame buffer (not shown) implemented at, or associated with, the camera controller 210.

At block 316 the eye tracking module 214 processes the IR imagery to determine a 3D representation of the eye at the time of the imagery capture. Alternatively, the GPU 215 may be utilized to generate the 3D representation and in such instances the eye tracking module 214 may be considered to be part of the GPU 215. In at least one embodiment the photon-detecting cells of the display panel 102 are organized into two subsets, with each subset capturing a corresponding IR image of the eye 108, resulting in a stereo pair of IR images of the eye that the eye tracking module 214 may analyze using a parallax-based process 318, which is described in greater detail below with reference to FIGS. 5-8. In another embodiment, the photon-detecting cells of the display panel 102 and the camera controller 210 may be configured to detect a phase change in the IR light between when the IR light is emitted by the IR light sources 126-129 and when the reflected IR light is received by the corresponding photon-detecting cells. From these detected phase changes the eye tracking module 214 may determine the 3D representation of the eye 108 through application of a ToF process 320. The resulting 3D representation of the eye 108 may include, for example, a depth image of the eye 108 or other 3D representation.

At block 322, the eye tracking module 214 uses the 3D representation of the eye 108 to track the eye 108 using any of a variety of eye-tracking algorithms based on a depth image of an eye or other suitable 3D representation. This tracking may include, for example, determining whether the eye 108 is in fact present in its anticipated position, the position of an eyelid of the eye 108 (that is, whether the eyelid is up or down), a position of the eye 108 (e.g., a position of the pupil or iris of the eye), an orientation of the eye 108, a gaze direction of the eye 108, and the like.

With one or more of the gaze parameters of the eye 108 determined, at block 324 the eye-tracking module 214 may modify the operation of one or more components of the hardware configuration 200 accordingly. To illustrate, in some embodiments the current gaze direction may be used to provide a foveated display, and thus in such instances, the eye-tracking module 214 may signal the current gaze direction to the VR/AR application 216 or the display controller 208 so as control the rendering of the displayed imagery to provide improved resolution in the area of current focus of the eye 108. As another example, in some embodiments the VR/AR application 216 or another software application may utilize the user's gaze direction as a user input. For example, a near-eye display system may seek to provide eye-based human computer interaction, and thus the eye-tracking module 214 may provide the current gaze direction to this application as user interface input; that is, as a virtual mouse or for other eye "gesture" inputs. Other uses for this eye tracking information include, for example, using the presence or absence of the eye 108 to activate/deactivate the near-eye display device, using the position of the eyelid to detect that the user may be asleep and thus issue an alarm in response, for use as biometric information (e.g., for authenticating the user via the eye movements or otherwise identifying the user via eye tracking), and the like.

Figure 4:
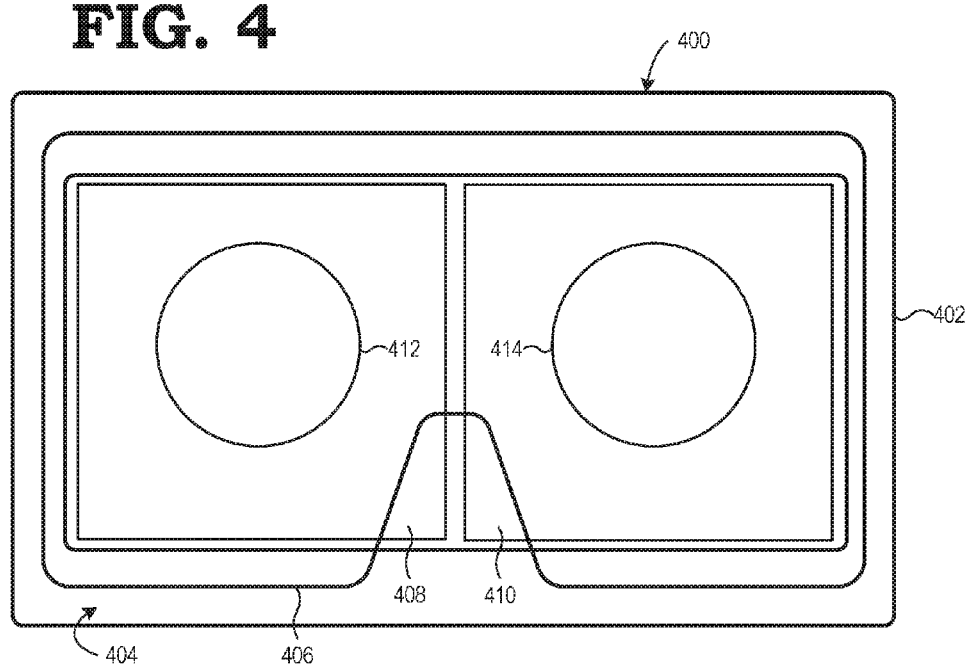
FIG. 4 is a diagram illustrating a rear view of a head-mounted display implementing an in-cell gaze tracking system in accordance with at least one embodiment of the present disclosure.

FIG. 4 illustrates an example HMD device 400 configured to implement the eye-tracking system 100 of FIGS. 1 and 2 in accordance with at least one embodiment. The HMD device 400 is mounted to the head of the user through the use of an apparatus strapped to, or otherwise mounted on, the user's head such that the HMD device 400 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head moves. In such instances, a hand-held device operated in this manner also may be considered an implementation of the HMD device 400 even though it is not "mounted" via a physical attachment to the user's head.

The HMD device 400 comprises a housing 402 having a surface 404, and a face gasket 406 and set of straps or a harness (omitted from FIG. 4 for clarity) to mount the housing 402 on the user's head so that the user faces the surface 404 of the housing 402. In the depicted embodiment, the HMD device 400 is a binocular HMD and thus has a left-eye display panel 408 and a right-eye display panel 410 disposed at the surface 404 (with display panels 408, 410 collectively or separately representing an embodiment of the display panel 102). The displays panels 408, 410 may be implemented as separate display panels (that is independent display arrays driven by separate display driver hardware components) or the display panels 408, 410 may be implemented as logically-separated regions of a single display panel (e.g., a single display panel logically divided into left and right "halves"). Further, in some embodiments, the display for each eye may be implemented as array of multiple display panels, some or all of which may implement the photon-detecting cells as described above. The housing 402 further includes an eyepiece lens 412 aligned with the left-eye display panel 408 and an eyepiece lens 414 aligned with the right-eye display panel 410. Alternatively, in some embodiments, the HMD device 400 may be implemented as a monocular HMD in that a single image is presented to both eyes of the user, either through left and right eyepiece lenses 412, 414, or directly without an intervening lens.

Figure 5:
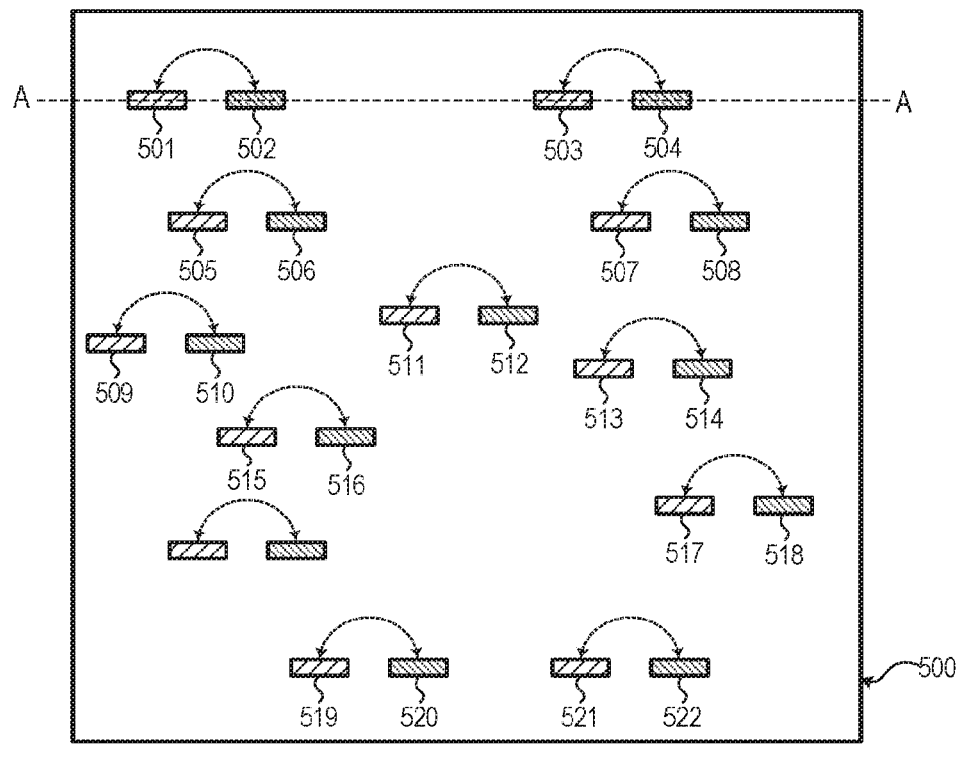
FIG. 5 is a diagram illustrating a simplified front-view of a portion of a display panel having paired photon-detecting cells interspersed among photo-emitting cells in accordance with at least one embodiment of the present disclosure.

FIGS. 5-8 illustrate an example implementation of the display panel 102 for use in capturing a stereo pair of images of the eye 108 for use in the parallax-based process 318 (FIG. 3) for eye tracking. As noted above, in some embodiments, the photon-detecting cells of the display panel 102 are organized into two subsets, identified herein as subsets A and B. The photon-detecting cells of subset A are used to capture one image of the eye 108, and the photon-detecting cells of subset B are used to concurrently capture a separate image of the eye 108. To this end, each photon-detecting cell of subset A is paired with a corresponding photon-detecting cell of subset B, and each such pair is this associated with a corresponding pixel location of the image. To illustrate, FIG. 5 depicts a front view of a portion 500 of the display panel 102, which includes photon-detecting cells 501-522 interspersed among photon-emitting cells (not shown) of the display panel 102. In this example, photon detecting cells 501, 503, 505, 507, 509, 511, 513, 515, 517, 519, and 521 are organized as subset A and photon-detecting cells 502, 504, 506, 508, 510, 512, 514, 516, 518, 520, and 522 are organized as subset B. Further, the photon-detecting cells 501-522 are paired as follows: cells 501-502, cells 503-504, cells 505-506, cells 507-508, cells 509-510, cells 511-512, cells 513-514, cells 515-516, cells 517-518, cells 519-520, and cells 521-522.

As each photon-detecting cell in a given pair is one or both of laterally offset or vertically offset from the other photon-detecting cell in the pair, each photon-detecting cell of the pair has a different view of the eye 108, and thus the resulting images generated by the subsets A and B of photon-detecting cells can be treated as a stereo pair of images and thus processed to determine a 3D image of the eye 108 using any of a variety of parallax-based algorithms.

The parallax afforded by these paired photon-detecting cells can be used to obtain a 3D view of the eye 108 based on one or both of an angle-based parallax analysis or a spatial-based parallax analysis. To illustrate an example of angle-based parallax processing, FIG. 6 depicts a cross-section view of the portion 500 of the display panel 102 along cut line A-A. Note that although omitted from FIG. 6 for ease of illustration, one or more optical lenses may be positioned along a view axis between the display panel 102 and the eye 108. As shown, the eye 108 is observed at different angles by the paired photon-detecting cells 501-502, with this difference in view angle denoted as "$\Delta\theta\_1$". Likewise, the eye 108 is observed at different angles by the paired photon-detecting cells 503-504, with this difference in view angle denoted as ""$\Delta\theta\_2$". To facilitate computation, the display panel 102 may be fabricated such that the distance between paired photon-detecting cells is substantially equal for all pairs.

Figure 7:
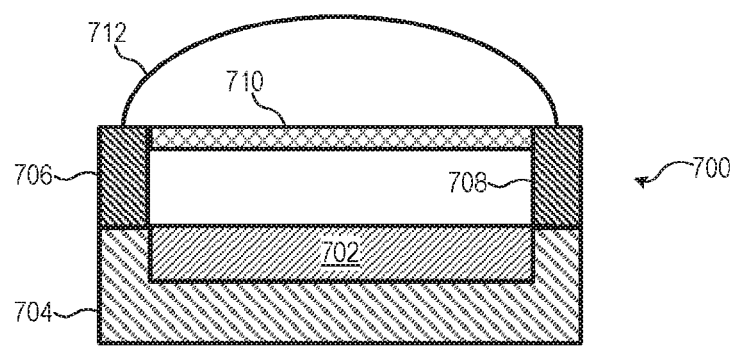
FIG. 7 is a cross-section view of a photon-detecting cell of the display panel of FIG. 5 in accordance with at least one embodiment of the present disclosure.

To facilitate viewing of the eye 108 at different angles, some of all of the photon-detecting cells may include a microlens overlying the photon-detection circuitry of the photon-detecting cells and which permit light to enter the photon-detecting cells from certain angles while blocking light from other angles. For example, as shown in FIG. 6, photon-detecting cells 501-504 may be implemented with overlying microlenses 601-604, respectively. Further, FIG. 7 illustrates a cross-section view of an example CMOS-based photon-detecting cell 700 that may be implemented as these photon-detecting cells. As depicted, the photon-detecting cell 700 includes a photon-detecting region 702 in a substrate 704 of the display panel 102. The photon-detecting region 702 implements a metal oxide silicon (MOS) capacitor (not shown) that captures charge due to incident photons over an integration period. The captured charge is then converted to a corresponding digital value by transistor-based circuitry (not shown) adjacent to the MOS capacitor, and this digital value is then accessed and shifted out of the photon-detecting cell via signal lines (not shown) implemented in and/or above the substrate 704. The photon-detecting cell 700 further includes sidewalls 706 and 708 to prevent intrusion of light from adjacent cells, as well as an IR pass filter 710 overlying the photon-detecting region 702 so as to pass IR light and substantially block incident visible light, thereby improving the signal-to-noise ratio. Further, as shown, the photon-detecting cell 700 may include a microlens 712 overlying the IR pass filter 710. A CCD-based photon-detecting cell may be implemented in a similar manner.

For a spatial-based parallax analysis, the eye-tracking module 214 treats each subset of photon-detecting cells as effectively a separate "camera", and with this the known distance between the photon-detecting cells of each pair (i.e., the known distance between the two "cameras") and a known focus length of the two "cameras". For some or all spatial features of the eye 108 detected in the captured imagery, the eye-tracking module 214 determines the effective distance between the spatial feature in one captured image and the spatial feature in the other captured image, and then uses this effective distance, the known distance between the two "cameras", and the known focus length to triangulate the corresponding 3D depth of the spatial feature using any of a variety of well-known stereo-imaging depth map generation techniques.

FIG. 8 illustrates an example of the parallax-based approach to construction of a 3D representation of the eye 108. In the depicted example, a stereo pair of images 801, 802 is generated during one cycle of the eye-tracking process described above with reference to flow 304 of method 300. Image 801 represents an image of the eye 108 captured by the photon-detecting cells of subset A, and image 802 represents a different image of the eye 108 captured by the photon-detecting cells of subset B. As such, at block 804 any of a variety of stereopsis/parallax-based algorithms, including an angle-based parallax algorithm or a spatial-based parallax algorithm, may be applied to the stereo pair of images 801, 802 to generate a 3D representation 806 of the eye 108. In this case, the 3D representation may include, for example, a 3D depth map or depth image of the eye 108.

Further, as illustrated in FIG. 8, the IR light sources 126-129 may be present in the eye images 801, 802 as reflected point light sources 826-829, respectively. These reflected point light sources 826-829 may assist in registering the images 801, 802 to the same reference coordinate frame. Alternatively, because of the known, fixed relationship of the IR light sources 126-129 to the display panel 102, the corresponding reflected point light sources 826-829 may serve as a reference coordinate frame for tracking the gaze of the eye 108 relative to the display panel 102, and thus relative to the imagery displayed thereon, from the resulting 3D representation 806.

In addition to, or instead of, implementing the parallax-based technique described above, in some embodiments the eye-tracking system 100 employs a ToF-based technique to construct a 3D representation of the eye. In this implementation, the photon-detecting cells are configured to detect a phase change in the IR light from when it is emitted from the IR light sources to when the reflection of the IR light from the eye 108 is received by the corresponding photon-detecting cell. To illustrate, FIG. 9 depicts a cross-section view 900 of a portion of an implementation of the display panel 102 in which two photon-detecting cells 901, 902 are disposed among photon-emitting cells (not shown) of the display panel 102. Note that although omitted from FIG. 9 for ease of illustration, one or more optical lenses may be positioned along a view axis between the display panel 102 and the eye 108. One or more IR light sources are pulsed at a specific frequency, which floods the eye 108 with one or more waves of IR light, which are then reflected toward the photon-detecting cells 901, 902, which capture the reflected IR light. During this process, the IR light undergoes a phase shift between when it left the IR light source 126 and was detected by the photon-detecting cells 901, 902, with the amount of phase shift representing the length of the path traveled by the IR light and thus representing the depth of the corresponding area of the eye 108 from which the IR light was reflected. Thus, as represented by block 904, the eye-tracking module 214 may employ a ToF process to determine the phase shifts for the photon-detecting cells of the display panel 102. For example, with respect to IR light emitted by the IR light source 126, the phase shifts "$\Delta\phi\_1$" and "$\Delta\phi\_2$", respectively, may be detected using the photon-detecting cells 901, 902, and from these phase shifts the eye-tracking module 214 constructs a 3D representation 906 of the eye 108 in the form of a depth map or other depth image. From this 3D representation 906, one or more gaze features of the eye 108 may be determined, including but not limited to presence, position, or orientation of the eye 108, relative position of an eyelid of the eye 108, and the like.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. An "application", or "software" may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A near-eye display device comprising:
   a display panel comprising an array of photon-emitting cells interspersed with photon-detecting cells;
   a display controller coupled to the display panel, the display controller to control the display panel to display imagery using the array of photon-emitting cells; and
   a camera controller coupled to the display panel, the camera controller to control the display panel to capture imagery of an eye of a user using the photon-detecting cells; and
   an eye-tracking module coupled to the camera controller, the eye-tracking module to construct a three-dimensional representation of the eye based on the captured imagery.

2. The near-eye display device of claim 1, further comprising:
   a set of one or more infrared (IR) light sources disposed at corresponding positions in association with the display panel, the set of one or more IR light sources to illuminate the eye during the capture of the imagery of the eye.

3. The near-eye display device of claim 2, wherein:
   the camera controller is to activate the set of one or more IR light sources to illuminate the eye during a vertical synchronization period of the display panel for the array of photon-emitting cells.

4. The near-eye display device of claim 2, wherein:
   the eye-tracking module is to construct the three-dimensional representation of the eye based on a time-of-flight analysis.

5. The near-eye display device of claim 2, wherein:
   the set of one or more IR light sources comprises a set of one or more vertical-cavity surface-emitting lasers.

6. The near-eye display device of claim 1, wherein:
   the photon-detecting cells are arranged into a first subset and a second subset, wherein each photon-detecting cell of the first subset is paired with a corresponding photon-detecting cell of the second subset;
   the camera controller is to concurrently capture a first image of the eye using the photon-detecting cells of the first subset and to capture a second image of the eye using the photon-detecting cells of the second subset; and
   the eye-tracking module is to determine the three-dimensional representation of the eye using parallax-based analysis of the first and second images.

7. The near-eye display device of claim 6, wherein:
the display panel further comprises a microlens disposed over each photon-detecting cell of at least some of the photon-detecting cells of the display panel.

8. The near-eye display device of claim 1, wherein:
the eye-tracking module further is to determine, based on the three-dimensional representation of the eye, at least one of: a presence of the eye; a position of an eyelid of the eye; a position of the eye; an orientation of the eye; and a gaze direction of the eye.

9. The near-eye display device of claim 8, wherein:
at least one component of the near-eye display device is controlled based on the determined presence of the eye, position of the eyelid of the eye, position of the eye, orientation of the eye, or gaze direction of the eye.

10. The near-eye display device of claim 1, wherein the near-eye display device is a head-mounted display (HMD) device.

11. In a near-eye display device having a display panel comprising an array of photon-emitting cells interspersed with photon-detecting cells, a method comprising:
controlling, using a display controller of the device, the display panel to display imagery using the array of photon-emitting cells; and
controlling, using a camera controller of the device, the display panel to capture imagery of an eye of a user using the photon-detecting cells; and
constructing, using an eye-tracking module of the device, a three-dimensional representation of the eye based on the captured imagery.

12. The method of claim 11, further comprising:
activating a set of one or more infrared (IR) light sources disposed at corresponding positions in association with the display panel so as to illuminate the eye during the capture of the imagery of the eye.

13. The method of claim 12, wherein:
activating the set of one or more IR light sources comprises activating the set of one or more IR light sources during a vertical synchronization period of the display panel for the array of photon-emitting cells.

14. The method of claim 12, wherein:
constructing the three-dimensional representation of the eye comprises constructing the three-dimensional representation of the eye based on a time-of-flight analysis using the photon-detecting cells.

15. The method of claim 11, wherein:
the photon-detecting cells are arranged into a first subset and a second subset, wherein each photon-detecting cell of the first subset is paired with a corresponding photon-detecting cell of the second subset;
controlling the display panel to capture imagery of the eye comprises controlling the display panel to capture a first image of the eye using the photon-detecting cells of the first subset and to capture a second image of the eye using the photon-detecting cells of the second subset; and
constructing the three-dimensional representation of the eye comprises constructing the three-dimensional representation of the eye using parallax-based processing of the first and second images.

16. The method of claim 11, further comprising:
determining, using the eye-tracking module, at least one of: a presence of the eye; a position of an eyelid of the eye; a position of the eye; an orientation of the eye; and a gaze direction of the eye based on the three-dimensional representation of the eye.

17. The method of claim 16, further comprising:
controlling at least one component of the near-eye display device based on the determined presence of the eye, position of the eyelid of the eye, position of the eye, orientation of the eye, or gaze direction of the eye.

18. In a near-eye display device, a method comprising:
displaying imagery to an eye of a user via a set of photon-emitting cells of a display panel of the device;
capturing imagery of the eye via a set of photon-detecting cells interspersed among the photon-emitting cells of the display panel;
determining a gaze characteristic of the eye based on the captured imagery; and
controlling an operation of the device based on the gaze characteristic.

19. The method of claim 18, wherein:
determining the gaze characteristic comprises determining at least one of: a presence of the eye and a position of an eyelid of the eye; and
controlling an operation of the device comprises at least one of: activating or deactivating the display panel based on at least one of the presence of the eye and the position of the eyelid.

20. The method of claim 18, wherein:
determining the gaze characteristic comprises determining a gaze direction of the eye; and
controlling an operation of the device comprises modifying the imagery displayed to the eye of the user based on the gaze direction.

21. The method of claim 18, wherein:
determining the gaze characteristic comprises determining a three-dimensional representation of the eye based on the captured imagery.

22. The method of claim 21, wherein:
determining the three-dimensional representation of the eye comprises determining the three-dimensional representation of the eye based on time-of-flight analysis of the captured imagery.

23. The method of claim 21, wherein:
capturing imagery of the eye comprises concurrently capturing a first image of the eye using a first subset of the photon-detecting cells and capturing a second image of the eye using a second subset of the photon-detecting cells; and
determining the three-dimensional representation of the eye comprises determining the three-dimensional representation of the eye based on parallax-based processing of the first and second images.

\* \* \* \* \*